US009321479B2

(12) United States Patent
Wankhede et al.

(10) Patent No.: US 9,321,479 B2
(45) Date of Patent: Apr. 26, 2016

(54) VEHICLE POWER STEERING WASTE HEAT RECOVERY

(75) Inventors: Mukund S. Wankhede, Fort Gratiot, MI (US); Lee E. Krispin, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 2581 days.

(21) Appl. No.: 11/946,073

(22) Filed: Nov. 28, 2007

(65) Prior Publication Data

US 2009/0133646 A1 May 28, 2009

(51) Int. Cl.
*B60H 1/00* (2006.01)
*B62D 5/06* (2006.01)
*B60H 1/14* (2006.01)
*F28D 15/00* (2006.01)

(52) U.S. Cl.
CPC ........ *B62D 5/062* (2013.01); *B60H 1/14* (2013.01); *F28D 15/00* (2013.01); *F01P 2060/08* (2013.01)

(58) Field of Classification Search
CPC .......... B62D 5/062; B60H 1/14; F28D 15/00; F01P 2060/08
USPC ............. 165/202, 41, 42, 43, 51, 52, 260, 165/104.14, 44; 237/2 A, 2 R, 2 B, 5, 12.3 R, 237/12.3 B, 34; 180/428, 427; 123/41.31
See application file for complete search history.

(56) References Cited

U.S. PATENT DOCUMENTS

| | | | |
|---|---|---|---|
| 3,411,293 A * | 11/1968 | Akins | 60/454 |
| 4,705,214 A * | 11/1987 | Johnson | 237/12.3 C |
| 5,002,117 A * | 3/1991 | Buckley et al. | 165/44 |
| 5,024,377 A * | 6/1991 | Harrison | 237/2 A |
| 5,839,398 A * | 11/1998 | Hamilton | 123/41.33 |
| 5,887,671 A * | 3/1999 | Yuki et al. | 180/68.1 |
| 5,954,266 A | 9/1999 | Hoshino et al. | |
| 6,035,930 A * | 3/2000 | Schwartz | 165/169 |
| 6,345,682 B1 * | 2/2002 | Schoffler et al. | 180/441 |
| 6,427,640 B1 * | 8/2002 | Hickey et al. | 123/41.31 |
| 6,691,925 B2 * | 2/2004 | Roberts et al. | 237/12.3 R |
| 7,210,522 B2 * | 5/2007 | Gruian | 165/202 |
| 7,458,414 B2 * | 12/2008 | Simon | 165/41 |
| 2006/0008356 A1 * | 1/2006 | Smith et al. | 417/182 |
| 2007/0080014 A1 * | 4/2007 | Kamman | 180/417 |

FOREIGN PATENT DOCUMENTS

| | | |
|---|---|---|
| CN | 1854003 A | 11/2006 |
| DE | 2943526 A1 | 5/1981 |
| DE | 3506040 A1 | 9/1985 |
| EP | 0736703 A1 | 10/1996 |
| JP | 59102611 A | 6/1984 |
| WO | WO 2006078199 A1 * | 7/2006 |

* cited by examiner

*Primary Examiner* — Travis Ruby

(57) ABSTRACT

A power steering waste heat recovery system for a vehicle and method of operating is disclosed. The system may include a power steering system and a waste heat absorption system. The power steering system may include a power steering pump, a liquid-to-liquid heat exchanger located downstream of the power steering pump and configured to allow power steering fluid flow therethrough, and a steering rack operatively engaging the heat exchanger to receive the power steering fluid therefrom. The waste heat absorption system may include an auxiliary heater loop configured to direct a liquid through the heat exchanger; and an automatically controllable heat control valve having an inlet, a first outlet for directing the liquid to bypass the auxiliary heater loop, and a second outlet for directing the liquid through the heat exchanger in the auxiliary heater loop.

10 Claims, 2 Drawing Sheets

VEHICLE POWER STEERING WASTE HEAT RECOVERY

BACKGROUND OF INVENTION

The present invention relates generally to waste heat recovery from a power steering system.

An ongoing concern with automotive vehicles is quick warm-up of the passenger cabin on cold winter days. For conventional gasoline powered automotive vehicles, when outside ambient temperatures are low and the vehicle has not been operated for a time, slow engine coolant warm-up results in a slow warm-up of the passenger cabin. In particular, with fuel economy becoming more of a concern, many automotive vehicles are employing smaller engines or diesel engines, which exacerbates the issue. Thus, some have resorted to add-on auxiliary heating systems, such as, for example, electric heaters, fuel fired heaters, engine driven viscous heaters, and hot gas heaters. All of these auxiliary heating systems, however, use extra fuel, or put extra load on the engine in order to produce the heat, which is counter to the original intended purpose of improving vehicle fuel economy.

In addition, for automotive vehicles with automatic transmissions, operation of the transmission when the transmission oil is cold can result in less than optimal transmission operation. Thus, this can lead to a reduction in fuel economy under cold operating conditions.

SUMMARY OF INVENTION

One or more embodiments may contemplate a power steering waste heat recovery system for a vehicle that may comprise a power steering system and a waste heat absorption system. The power steering system may include a power steering pump, a liquid-to-liquid heat exchanger located downstream of the power steering pump and configured to allow power steering fluid flow therethrough, and a steering rack operatively engaging the heat exchanger to receive the power steering fluid therefrom. The waste heat absorption system including an auxiliary heater loop configured to direct a liquid through the heat exchanger; and an automatically controllable heat control valve having an inlet, a first outlet for directing the liquid to bypass the auxiliary heater loop, and a second outlet for directing the liquid through the heat exchanger in the auxiliary heater loop.

An embodiment contemplates a method of warming a liquid using heat from power steering fluid of a power steering system, the method comprising the steps of: pumping the power steering fluid through a liquid-to-liquid heat exchanger, a power steering rack, and a liquid-to-air power steering cooler; determining if an ambient air temperature is below a predetermined ambient air temperature threshold; determining if a liquid temperature of a waste heat absorption system is below a predetermined liquid temperature threshold; and actuating a heat control valve to direct the liquid to bypass an auxiliary heater loop containing the liquid-to-liquid heat exchanger if the ambient air temperature is not below the predetermined ambient air temperature threshold or the liquid temperature is not below the predetermined liquid temperature threshold.

An advantage of an embodiment is the ability to recover the energy supplied to the power steering system that is otherwise rejected as waste heat by selectively transferring the waste heat to coolant passing through an auxiliary coolant heater loop. This enhances the heater performance of a heating, ventilation and air conditioning (HVAC) system, allowing for a faster warm-up of a passenger cabin. The faster warm-up is achieved without the need for the engine to provide extra energy. A restriction introduced by the auxiliary coolant heater loop may also help to reduce noise emanating from the power steering system. Moreover, such an auxiliary coolant heater loop may be employed with minimal packaging and weight impact since the power steering system in typical automotive vehicles is close to the vehicle's instrument panel. Hence, coolant hoses to the heater core can be easily plumbed, and the small sized liquid-to-liquid heat exchanger can be easily packaged in the vehicle. In addition, no new vehicle fluids need to be introduced, since the vehicles already employ coolant and power steering fluid.

An advantage of an embodiment is the ability to recover the energy supplied to the power steering system that is otherwise rejected as waste heat by selectively transferring the waste heat to transmission oil passing through an auxiliary transmission oil heater loop. This may enhance the operation of the automatic transmission (or transaxle) by minimizing the time at which the transmission is operating with cold transmission oil, which has a higher than desired viscosity. The enhanced transmission performance may improve fuel economy under this operating condition.

DETAILED DESCRIPTION

Figure 1:
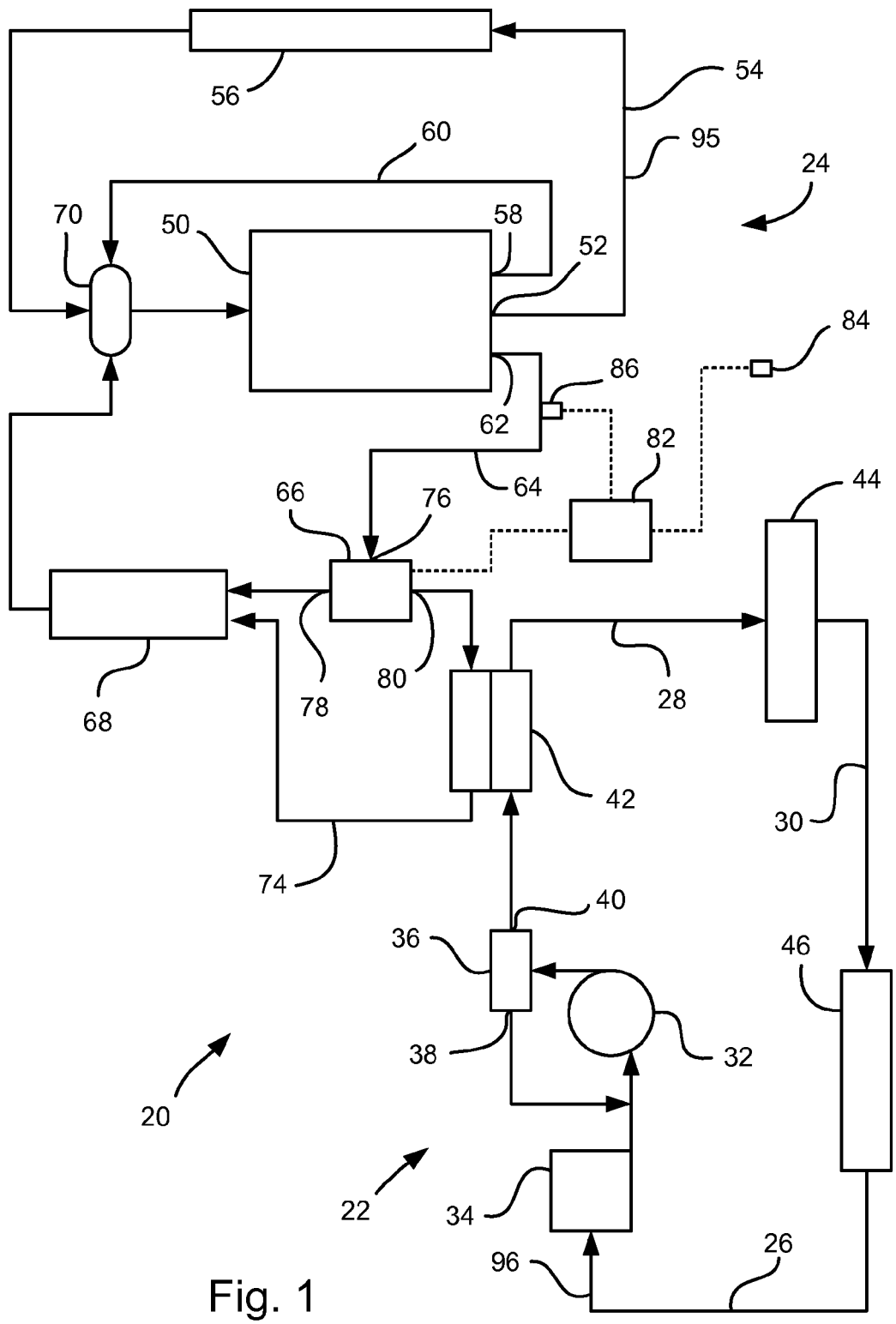
FIG. 1 is a schematic diagram of a power steering waste heat recovery system according to a first embodiment.

Referring to FIG. 1, a waste heat recovery system 20 for a vehicle is shown. The waste heat recovery system 20 encompasses portions of a power steering system 22 and a heating, ventilation and air conditioning (HVAC) system 24.

Figure 2:
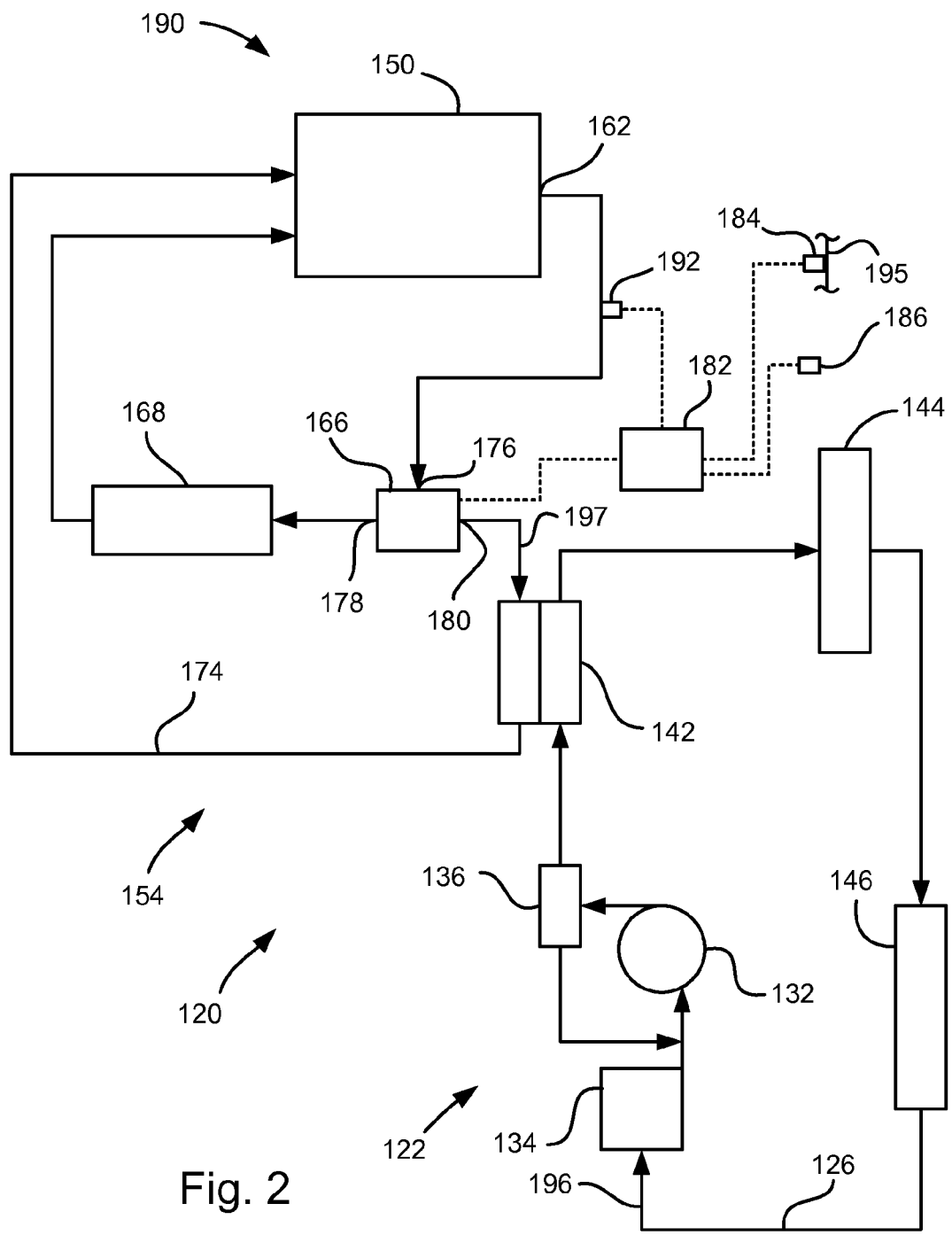
FIG. 2 is a schematic diagram of a power steering waste heat recovery system according to a second embodiment.

The power steering system 22 includes a hydraulic system 26 having a high pressure line 28 and low pressure line 30. The arrowheads on the lines between illustrated components in FIGS. 1 and 2 represent fluid lines, with the arrows indicating the direction of fluid flow in the particular line when there is flow in that line. A power steering pump 32, which may be driven by a pulley (not shown) coupled to the engine, draws power steering fluid 96 from a power steering reservoir 34 and directs it to a power steering control valve 36. The control valve 36 directs the power steering fluid 96 either through a first outlet 38 back to the intake side of the pump 32 or forwards it through a second outlet 40 into the high pressure line 28 on the high pressure side of the hydraulic system 26. The power steering fluid 96 is directed through a viscous heater with a liquid-to-liquid heat exchanger 42 before being directed into the steering rack 44. The fluid pressure applied to the steering rack is used to provide assistance to the steering process, which is accomplished in a conventional manner. The power steering fluid 96 exits the power steering rack 44 into the low pressure line 30 on the low pressure side of the hydraulic system 26, where it is directed through a power steering cooler 46 in order to allow for air cooling of the fluid 96. The power steering fluid 96 is then directed back into the power steering reservoir 34.

The portion of the HVAC system 24 shown is the heating portion of the system, and uses engine coolant 95 as its system fluid. An engine 50 includes a first coolant outlet 52 to a radiator cooling loop 54, within which is a radiator 56. A second coolant outlet 58 directs coolant 95 into an engine coolant bypass loop 60. A third coolant outlet 62 directs coolant 95 into a heater core coolant loop 64, within which is located a heat control valve 66 and a heater core 68. Each of the coolant loops 54, 60, 64 directs the coolant 95 back to a thermostat and water pump 70 (shown with a single symbol in FIG. 1). The thermostat and water pump may operate a conventional manner, as is known to those skilled in the art. While three engine coolant outlets 52, 58, 62 are schematically shown and discussed, this may be a single opening from the engine 50, with hoses that split into the three loops 54, 60, 64.

The heater core 68, heat control valve 66 and viscous heater 42 also form a portion of an auxiliary coolant heater loop 74. The heat control valve 66 includes an inlet 76 from the third coolant outlet 62 and two outlets—a heater core outlet 78 directing coolant 95 to the heater core 68, and a viscous heater outlet 80 directing coolant 95 to the viscous heater 42. Coolant 95 directed into the heat exchanger 42 is then directed to the heater core 68 to complete the auxiliary coolant heater loop 74. A controller 82 controls the heat control valve 66, which controls to which outlet 78 or 80 the coolant 95 is directed. Dashed lines in FIGS. 1 and 2 represent control or communication lines, such as electrical wires. The controller 82 may be a stand alone controller or may be incorporated into another vehicle controller, such as a HVAC controller, if so desired. An ambient air temperature sensor 84 and a coolant temperature sensor 86 may be in communication with the controller 82. The sensors 84, 86 may be located as desired on the vehicle in order to get the desired ambient air and coolant temperature readings.

The operation of the waste heat recovery system 20 as it interacts with the power steering system 22 and HVAC system 24 will now be discussed. When the vehicle is operating, the power steering system 22 essentially operates the same as conventional power steering systems with the exception that the power steering fluid 96 now flows through the heat exchanger 42. The operation of the power steering system 22 causes the power steering fluid 96 to heat up as part of the normal operation of the system. Also, with the heat control valve 66 set to direct the coolant 95 through the heater core outlet 78 to the heater core 68, the HVAC system and engine cooling essentially operate the same as with a conventional system.

However, when the temperature sensors 84, 86 detect that the ambient temperature is below a predetermined ambient temperature threshold and the coolant temperature is below a predetermined coolant temperature threshold, and the HVAC system 24 is in a heater mode, then the controller 82 will actuate the heat control valve 66 to cause the coolant 95 to flow through the viscous heater outlet 80. The coolant 95, then, flows through the heat exchanger 42 where it absorbs heat from the power steering fluid 96. Thus, waste heat from the power steering system 22 is transferred to the HVAC system 24. This warmed coolant 95 then flows through the auxiliary coolant heater loop 74 to the heater core 68 and back to the engine 50. The extra heat absorption by the coolant 95 in the heat exchanger 42 will provide additional heat sooner to the heater core 68. Thus, the time to heat the vehicle passenger cabin on cold days when the coolant 95 starts out near ambient temperature is reduced. Once the coolant 95 warms up due to engine operation, the controller 82 will then actuate the heat control valve 66 to direct the coolant 95 through the heater core outlet 78.

FIG. 2 illustrates a second embodiment. Since this embodiment is similar to the first, similar element numbers will be used for similar elements, but employing 100-series numbers. The power steering system 122, including the hydraulic system 126, power steering pump 132, power steering reservoir 134, power steering control valve 136, the viscous heater with liquid-to-liquid heat exchanger 142, power steering rack 144 and power steering cooler 146, may remain essentially unchanged from the first embodiment.

In this embodiment, the heat exchanger 142 is coupled to an auxiliary transmission oil heater loop 174 of a transmission oil cooling system 190, which incorporates part of the wasted heat recovery system 120. The auxiliary transmission oil heater loop 174 includes a heat control valve 166 that has an inlet 176 from an oil outlet 162 of a transmission (or transaxle) 150, a transmission oil cooler outlet 178 and a viscous heater outlet 180. The viscous heater outlet 180 directs transmission oil 197 to the heat exchanger 142, which then directs the transmission oil 197 back to the transmission 150 to complete the auxiliary transmission oil heater loop 174. The transmission oil cooler outlet 178 directs the transmission oil 197 to a transmission oil cooler 168, which then directs the transmission oil 197 back to the transmission 150 to complete a transmission oil cooling loop 154.

A controller 182 controls the heat control valve 166, which controls to which outlet 178 or 180 the transmission oil 197 is directed. The controller 182 may be a stand alone controller or may be incorporated into another vehicle controller, such as a transmission (or transaxle) controller, if so desired. An ambient air temperature sensor 184, a coolant temperature sensor 186 and transmission oil temperature sensor 192 may be in communication with the controller 182. The sensors 184, 186, 192 may be located as desired on the vehicle in order to get the desired temperature readings.

The operation of the waste heat recovery system 120 as it interacts with the power steering system 122 and transmission oil cooling system 124 will now be discussed. When the vehicle is operating, the power steering system 122 essentially operates the same as convention power steering systems with the exception that the power steering fluid 196 now flows through the heat exchanger 142. The operation of the power steering system 122 causes the power steering fluid 196 to heat up as part of the normal operation of the system. Also, with the heat control valve 166 set to direct the transmission oil 197 through the transmission oil cooler outlet 178 to the transmission oil cooler 168, the transmission oil cooling system 124 essentially operates the same as with a conventional system.

However, when the temperature sensors 184, 186, 192 detect that the ambient temperature is below a predetermined ambient temperature threshold, the coolant temperature is below a predetermined coolant temperature threshold, and the transmission oil temperature is below a predetermined transmission oil temperature threshold, then the controller 182 will actuate the heat control valve 166 to cause the transmission oil 197 to flow through the viscous heater outlet 180. The transmission oil 197, then, flows through the heat exchanger 142 where it absorbs heat from the power steering fluid 196. This warmed transmission oil 197 then flows through the auxiliary transmission oil heater loop 174 and back to the transmission 150. One will note that, in this mode, the transmission oil 197 does not flow through the transmission oil cooler 168. The extra heat absorption by the transmission oil 197 in the heat exchanger 142 will provide additional heat sooner, thus reducing the time to optimal transmission operation on cold days when the transmission oil 197 starts out near ambient temperature. Once the transmission oil 197 warms up due to vehicle operation, the controller 182 will then actuate the heat control valve 166 to direct the transmission oil 197 through the transmission oil cooler outlet 178.

While certain embodiments of the present invention have been described in detail, those familiar with the art to which this invention relates will recognize various alternative designs and embodiments for practicing the invention as defined by the following claims.

What is claimed is:

1. A power steering waste heat recovery system for a vehicle comprising:
    a power steering system including a power steering pump, a liquid-to-liquid heat exchanger located downstream of the power steering pump and configured to allow power steering fluid flow through the heat exchanger, and a steering rack operatively engaging the heat exchanger to receive the power steering fluid from the heat exchanger; and
    a waste heat absorption system including an auxiliary heater loop configured to direct a liquid through the heat exchanger; and an automatically controllable heat control valve having an inlet, a first outlet for directing the liquid to bypass the auxiliary heater loop, and a second outlet for directing the liquid through the heat exchanger in the auxiliary heater loop.

2. The power steering waste heat recovery system of claim 1 wherein the waste heat absorption system is a portion of a vehicle heating, ventilation and air conditioning system, the liquid is a coolant, the first outlet of the heat control valve directs the coolant through a heater core, and the coolant flowing from the heat exchanger is directed to the heater core.

3. The power steering waste heat recovery system of claim 2 wherein the coolant is directed from an engine to the inlet of the heat control valve and an outlet of the heater core directs the coolant to a water pump.

4. The power steering waste heat recovery system of claim 1 wherein the waste heat absorption system is a portion of a vehicle transmission oil cooling system, the liquid is transmission oil, the first outlet of the heat control valve directs the transmission oil through a transmission oil cooler, and the transmission oil flowing from the heat exchanger is directed to a transmission without flowing through the transmission oil cooler.

5. The power steering waste heat recovery system of claim 4 wherein the transmission oil is directed from the transmission to the inlet of the heat control valve.

6. The power steering waste heat recovery system of claim 1 wherein the waste heat absorption system includes an electronic controller that is configured to control the actuation of the heat control valve.

7. The power steering waste heat recovery system of claim 6 wherein the liquid is a coolant and the controller is configured to actuate the heat control valve to direct the coolant through the second outlet only when an ambient temperature is below a predetermined ambient temperature threshold, a coolant temperature is below a predetermined coolant temperature threshold, and a heat to passenger cabin request is received.

8. The power steering waste heat recovery system of claim 6 wherein the liquid is transmission oil and the controller is configured to actuate the heat control valve to direct the transmission oil through the second outlet only when an ambient temperature is below a predetermined ambient temperature threshold and the transmission oil temperature is below a predetermined transmission oil temperature threshold.

9. The power steering waste heat recovery system of claim 8 wherein the controller is configured to actuate the heat control valve when a temperature of an engine coolant is also below a predetermined coolant temperature threshold.

10. The power steering waste heat recovery system of claim 1 wherein the power steering system includes a liquid-to-air power steering cooler heat exchanger having an inlet configured to receive power steering fluid from the steering rack.

* * * * *